(12) United States Patent
Sun et al.

(10) Patent No.: US 12,583,373 B2
(45) Date of Patent: Mar. 24, 2026

(54) VEHICLE HEADREST

(71) Applicant: AAC Microtech (Changzhou) Co., Ltd., Changzhou (CN)

(72) Inventors: Shuyuan Sun, Changzhou (CN); Yiming Meng, Changzhou (CN); Xin Zhang, Changzhou (CN); Xiang Huang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 167 days.

(21) Appl. No.: 18/743,085

(22) Filed: Jun. 13, 2024

(65) Prior Publication Data

US 2025/0303945 A1      Oct. 2, 2025

Related U.S. Application Data

(63) Continuation of application No. PCT/CN2024/083712, filed on Mar. 26, 2024.

(51) Int. Cl.
*H04R 1/34* (2006.01)
*B60N 2/879* (2018.01)
*H04R 5/02* (2006.01)

(52) U.S. Cl.
CPC ............. *B60N 2/879* (2018.02); *H04R 5/023* (2013.01); *H04R 2205/024* (2013.01); *H04R 2499/13* (2013.01)

(58) Field of Classification Search
CPC .... H04R 2499/13; H04R 5/023; H04R 1/403; H04R 3/12; H04R 1/347; B60R 11/0217
See application file for complete search history.

(56) References Cited

U.S. PATENT DOCUMENTS

| | | | | |
|---|---|---|---|---|
| 5,729,605 | A | * | 3/1998 | Bobisuthi ............ H04R 1/1041 |
| | | | | 379/433.02 |
| 10,028,048 | B2 | * | 7/2018 | Ozawa ................. H04R 1/2819 |
| 11,908,443 | B2 | * | 2/2024 | Mehta .................... H04R 5/023 |
| 11,950,047 | B2 | * | 4/2024 | Corynen ............... H04R 1/028 |
| 12,207,049 | B2 | * | 1/2025 | Corynen .................. H04R 7/18 |
| 12,244,989 | B2 | * | 3/2025 | Shiwaku ............. H04R 1/1008 |
| 12,401,948 | B2 | * | 8/2025 | Fukui ..................... H04R 5/023 |
| 2017/0257690 | A1 | * | 9/2017 | Ozawa ................. H04R 1/2819 |
| 2022/0201385 | A1 | * | 6/2022 | Corynen .................. H04R 7/18 |
| 2023/0075413 | A1 | * | 3/2023 | Mehta .................... H04R 5/023 |
| 2023/0199377 | A1 | * | 6/2023 | Corynen ............... H04R 1/025 |
| | | | | 381/86 |
| 2025/0071456 | A1 | * | 2/2025 | Naka ...................... H04R 1/347 |
| 2025/0303945 | A1 | * | 10/2025 | Sun ........................ H04R 1/345 |

* cited by examiner

*Primary Examiner* — Shin H Kim
(74) *Attorney, Agent, or Firm* — Wiersch Law Group

(57) ABSTRACT

The present disclosure discloses a vehicle headrest including a main body having a receiving chamber and a first sound hole, and a speaker module including a housing fixed to the main body and including a sound outlet, a speaker unit including a diaphragm, and an acoustic inverting tube. The housing further comprises a back sound hole communicated with the coupling back cavity; the acoustic inverting tube is received in the coupling back cavity. The sound wave output from the back sound hole has a first sound phase, the sound wave output from the sound outlet has a second sound phase, a difference between the first sound phase and the second sound phase is in a range of 2π/3-4π/3. The vehicle headrest in the present disclosure has better sound quality and higher acoustic privacy.

8 Claims, 14 Drawing Sheets

A-A

C-C

E-E

VEHICLE HEADREST

FIELD OF THE PRESENT DISCLOSURE

The present disclosure relates to vehicle accessories technologies, especially relates to a vehicle headrest.

DESCRIPTION OF RELATED ART

With the intelligent of the vehicle cabin, an audio system is a key component focused by users in the vehicle entertainment system. A vehicle headrest served as the audio system is equipped in increasing vehicles for providing better near field surrounding sound quality and individual voice interaction for drivers.

In related art, a speaker module included in the vehicle headrest has small size limited by the size of the vehicle headrest, thus having worse sound quality compared with the vehicle audio system. Besides, the vehicle headrest in related art is unable to achieve relatively individual sound range for passengers or drivers and ensure the privacy of the voice interaction.

Therefore, it is necessary to provide an improved vehicle headrest to overcome the problems mentioned above.

SUMMARY OF THE INVENTION

One object of the present disclosure is to provide a vehicle headrest with better sound quality and higher acoustic privacy.

A vehicle headrest including a main body having a receiving chamber, and including a first sound hole penetrating thereon; and a speaker module at least partially received in the receiving chamber, including: a housing fixed to the main body, including a sound outlet penetrating thereon; a speaker unit received in the housing, including a diaphragm configured to vibrate to generate sound wave transmitted to outside through the sound outlet; and an acoustic inverting tube having a first opening and a second opening located on both ends; wherein a coupling back cavity isolated from the sound outlet is enclosed by the diaphragm and the housing; the housing further includes a back sound hole communicated with the coupling back cavity; the acoustic inverting tube is received in the coupling back cavity; the first opening is communicated with the back sound hole; the second opening is communicated with the coupling back cavity; the first sound hole is communicated with the back sound hole; sound wave emitted from the back sound hole has a first sound phase, sound wave emitted from the sound outlet has a second sound phase, a difference between the first sound phase and the second sound phase is in a range of $2\pi/3$-$4\pi/3$.

As an improvement, the housing is wholly received in the receiving chamber; the housing includes a front cover, a back cover opposite to the front cover, and a side wall connected the front cover with the back cover; the sound outlet is provided on the front cover; the back sound hole is provided on the back cover; the main body further includes a second sound hole facing the sound outlet; sound wave generated by the diaphragm is transmitted to outside through the sound outlet and the second sound hole.

As an improvement, the diaphragm is fixed to the front cover and covers the sound outlet; the sound outlet is configured to face the diaphragm along a vibration direction of the diaphragm.

As an improvement, the diaphragm is fixed to the side wall; a front sound chamber communicated with the sound outlet is enclosed by the diaphragm, the side wall and the front cover; the sound outlet is malposed with the diaphragm along a vibration direction of the diaphragm.

As an improvement, the main body further includes a second sound hole penetrating thereon; the housing extends out of the receiving chamber through the second sound hole; the sound outlet is located outside the receiving chamber.

As an improvement, the housing includes a front cover, a back cover opposite to the front cover, and a side wall connected the front cover with the back cover; the front cover and part of the side wall extend out of the receiving chamber through the second sound hole; the sound outlet is provided on the side wall.

As an improvement, the front cover includes a protrusion located on a side towards the back cover; the diaphragm is mounted on the protrusion and the side wall; a front sound chamber communicated with the sound outlet is enclosed by the diaphragm, the side wall and the protrusion.

As an improvement, sound wave emitted from the back sound hole and sound wave emitted from the sound outlet satisfy the following formula:

$$U_1(r_1 + j\omega M_1) + (U_1 - U_s)\left(r_b + \frac{1}{j\omega C_b}\right) = 0$$

$U1$ represents a volume velocity of the back sound hole when emitting the sound wave;

$Us$ represents a volume velocity of the sound outlet when emitting the sound wave;

$r1$ represents an acoustic resistance of the acoustic inverting tube;

$M_1$ represents an acoustic mass of the acoustic inverting tube;

$r_b$ represents an acoustic resistance of the coupling back cavity;

$C_b$ represents an acoustic capacity of the coupling back cavity;

$\omega$ represents an angular frequency of the sound wave;

j is an imaginary unit.

BRIEF DESCRIPTION OF THE DRAWINGS

The accompanying drawings illustrate embodiments and constitute part of the specification, and together with the specification, serve to explain exemplary embodiments of the present disclosure. The accompanying drawings shown are only for illustrative purposes and do not limit the scope of the claims. In all the accompanying drawings, same reference signs refer to similar but not necessarily identical elements.

DETAILED DESCRIPTION OF THE EXEMPLARY EMBODIMENTS

Figure 1:
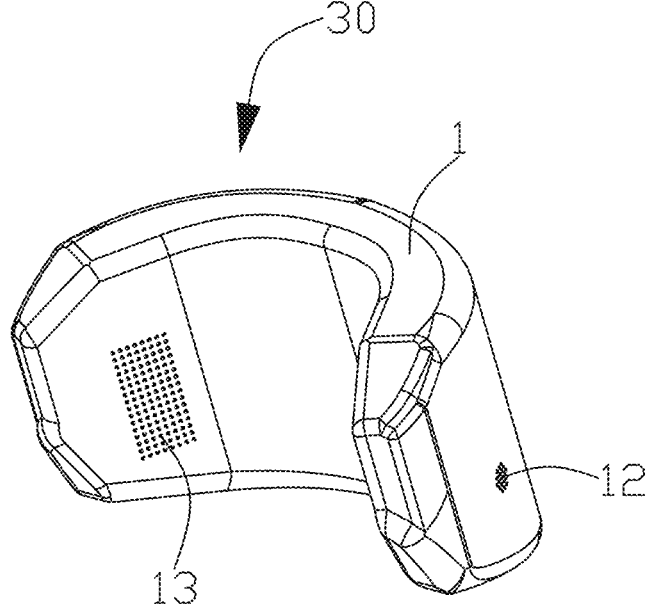
FIG. 1 is an isometric view of a vehicle headrest in accordance with a first exemplary embodiment of the present disclosure.
Figure 2:
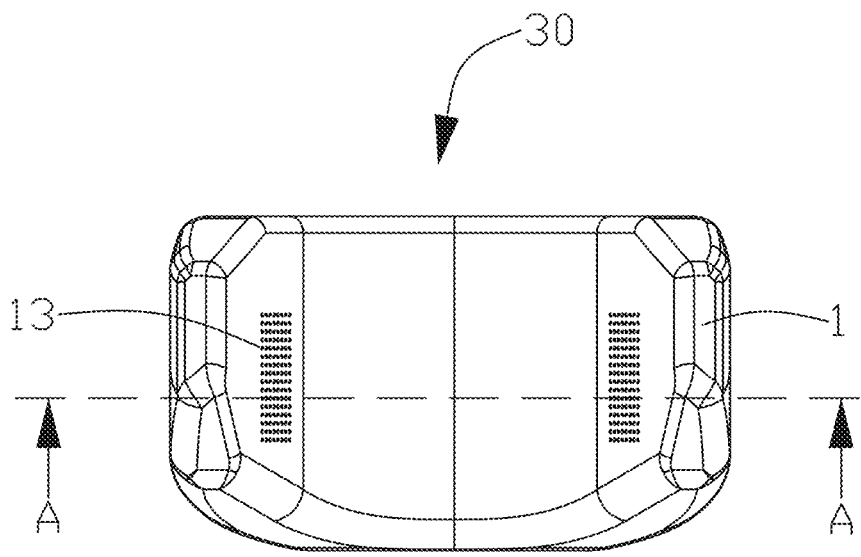
FIG. 2 is a front view of the vehicle headrest in FIG. 1.

In order to make the inventive objectives, features, and advantages of the present disclosure more understandable, the technical solutions in embodiments of the present disclosure will be described clearly and completely below with reference to the accompanying drawings in the embodiments of the present disclosure. It is apparent that the described embodiments are merely some of rather than all of the embodiments of the present disclosure. All other embodiments acquired by those skilled in the art without creative efforts based on the embodiments in the present disclosure shall fall within the protection scope of the present disclosure.

Please refer to FIGS. 1-10, a vehicle headrest 30 provided by an exemplary embodiment of the present disclosure includes a main body 1 having a receiving chamber 11, and a speaker module 2 at least partially received in the receiving chamber 11. The speaker module 2 includes a housing 21 fixed to the main body 1, a speaker unit 22 received in the housing 21, and an acoustic inverting tube 23 having a first opening 231 and a second opening 232 located on both ends. The speaker unit 22 is configured to converse the electrical signal into acoustic signal.

Figure 4:
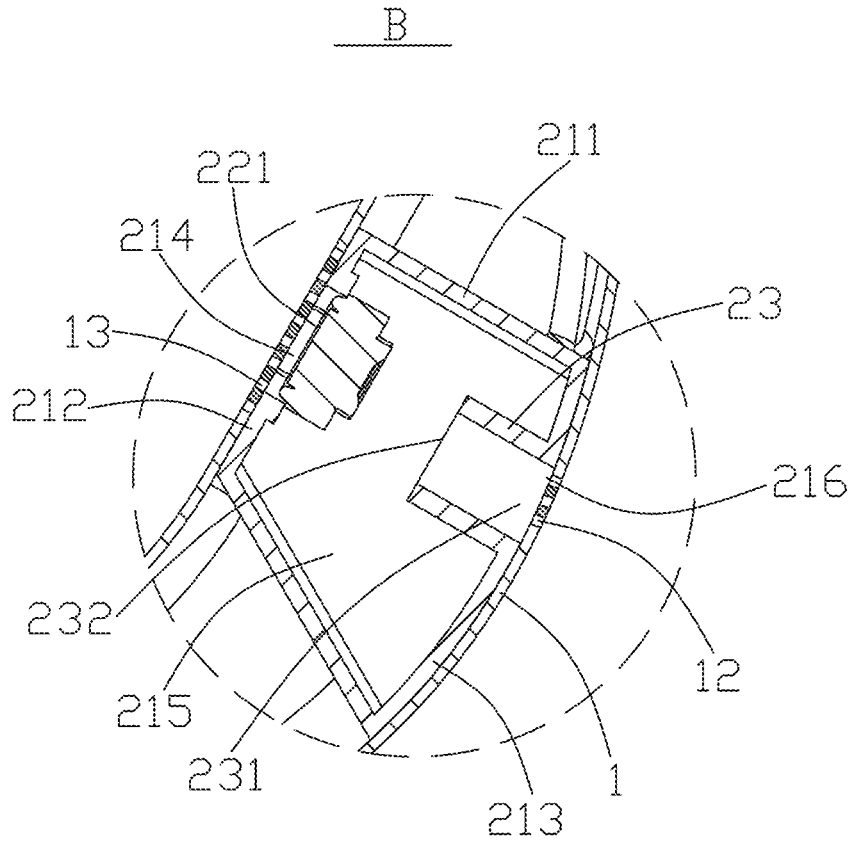
FIG. 4 is an enlarged view of Part B in FIG. 3.
Figure 7:
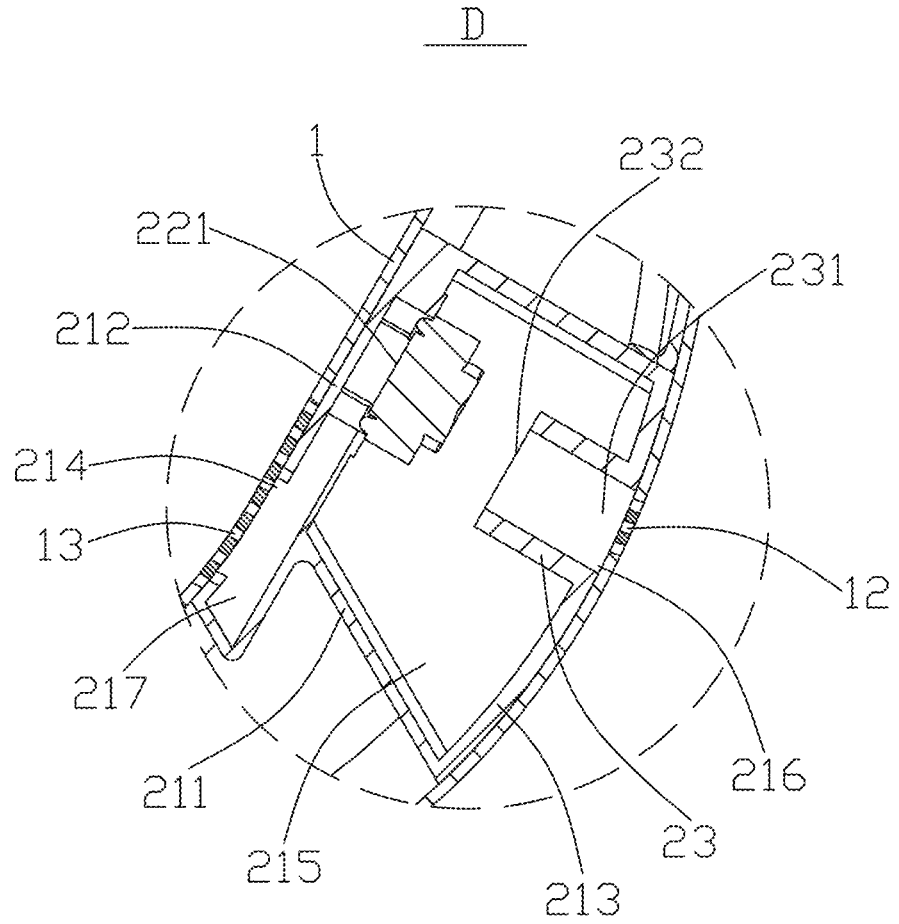
FIG. 7 is an enlarged view of Part D in FIG. 6.
Figure 10:
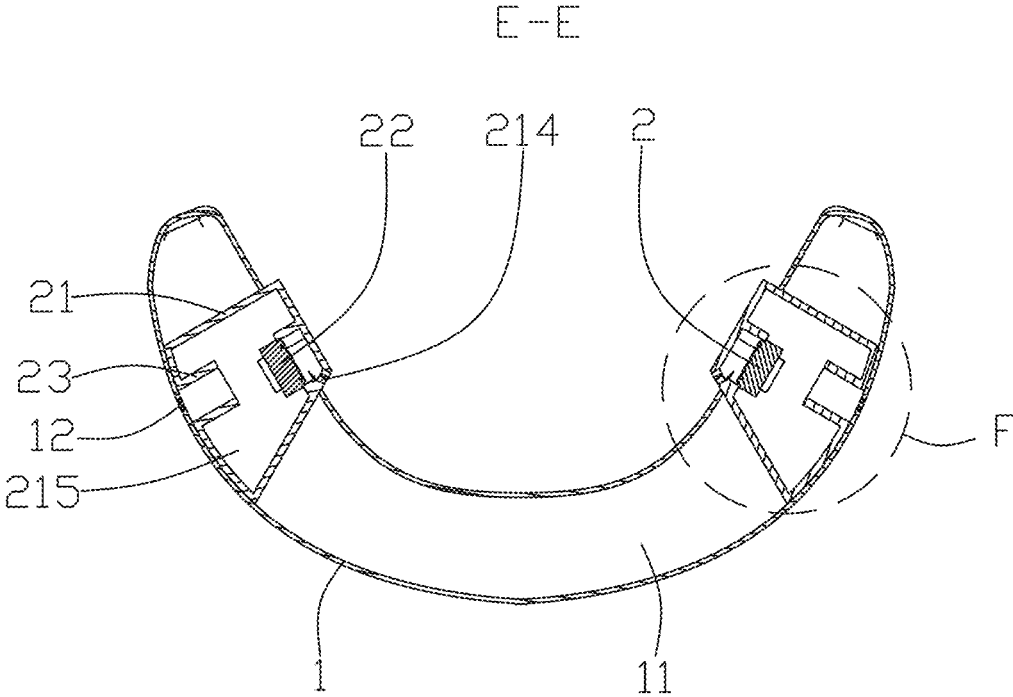
FIG. 10 is a cross-sectional view of the vehicle headrest taken along E-E line in FIG. 9.

As shown in FIG. 4, FIG. 7 and FIG. 10, the housing 21 includes a sound outlet 214 penetrating thereon. The speaker unit 22 includes a diaphragm 221 configured to vibrate to generate sound wave which is transmitted to outside through the sound outlet 214. A coupling back cavity 215 isolated from the sound outlet 214 is enclosed by the diaphragm 221 and the housing 21. The housing 21 further includes a back sound hole 216 communicated with the coupling back cavity 215. The acoustic inverting tube 23 is received in the coupling back cavity 215. The first opening 231 is communicated with the back sound hole 216. The second opening 232 is communicated with the coupling back cavity 215. The main body 1 includes a first sound hole 12 penetrating thereon. The first sound hole 12 is communicated with the back sound hole 216.

In the present disclosure, the mechanical vibration generated by the speaker unit 22 could be reduced by a component enclosing the coupling back cavity 215. The coupling back cavity 215 is configured to isolate the air vibration generated by the speaker unit 22 so that the air vibration cannot be transmitted to the main body 1, thus reducing the sound wave emitted due to passive vibration of vehicle headrest 30. Besides, the sound wave emitted by the speaker unit 22 through the sound outlet 214 is directly transmitted to user equipped with the vehicle headrest 30, thus improving the acoustic privacy of the vehicle headrest 30. Furthermore, the acoustic inverting tube 23 is configured to conduct the sound wave emitted from the back of the speaker unit 22 outside the speaker module 2, thus improving the low frequency performance of the speaker module 2 and the sound quality of the vehicle headrest 30 and further optimizing the acoustic experience of the vehicle headrest 30.

It should be noted that the sound outlet 214 is close to user's ear and the back sound hole 216 is away from user's ear. Therefore, the comfort of the vehicle headrest 30 increases with the decrease of its passive vibration.

Figure 3:
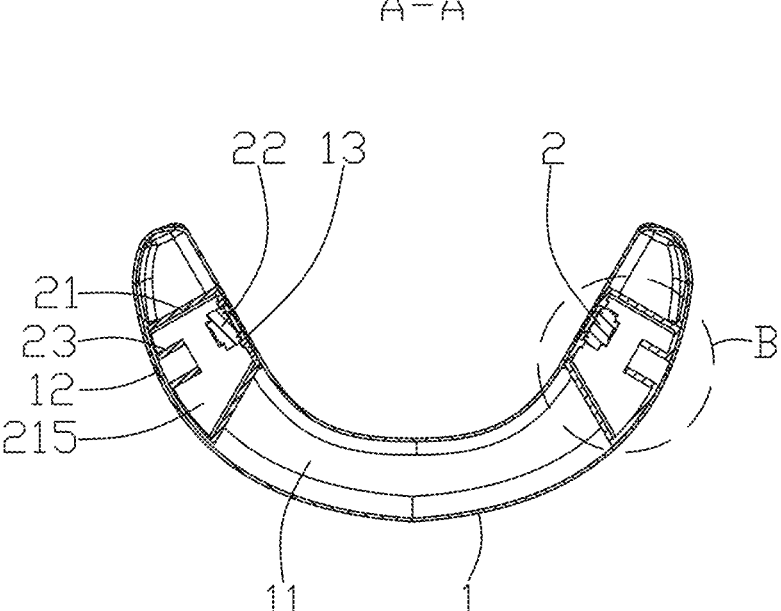
FIG. 3 is a cross-sectional view of the vehicle headrest taken along A-A line in FIG. 2.
Figure 8:
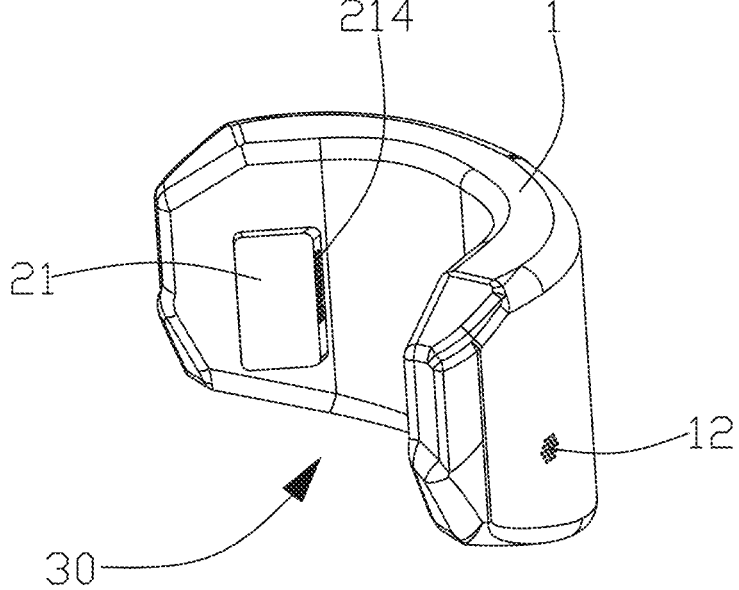
FIG. 8 is an isometric view of a vehicle headrest in accordance with a third exemplary embodiment of the present disclosure.
Figure 9:
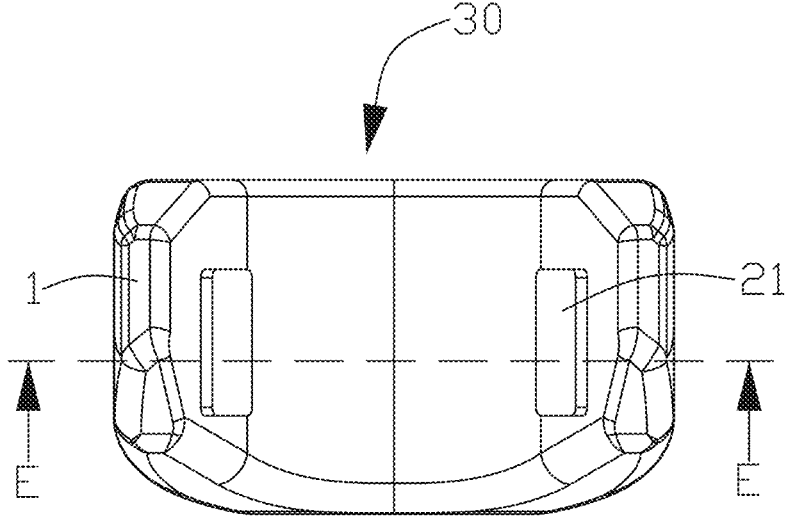
FIG. 9 is a front view of the vehicle headrest in FIG. 8.

In one embodiment, as shown in FIG. 3, two speaker modules 2 are symmetrically arranged in the main body 1. And, one acoustic inverting tube 23 is provided in the coupling back cavity 215. As shown in FIG. 1 and FIG. 8, the vehicle headrest 30 is in a U shape so that the two speaker modules 2 are symmetrically arranged along a central axis of the vehicle headrest 30 on two ends of the main body 1. Thus, the two speaker modules 2 correspond to user's ears separately to further improve the acoustic privacy of the vehicle headrest 30.

Embodiment 1

The vehicle headrest 30 in the present embodiment is a frontage sound emitting structure.

As shown in FIGS. 1-4, the housing 21 is wholly received in the receiving chamber 11. The housing 21 includes a front cover 212, a back cover 213 opposite to the front cover 212, and a side wall 211 connected the front cover 212 with the back cover 213. The sound outlet 214 is provided on the front cover 212. The back sound hole 216 is provided on the back cover 213. The main body 1 further includes a second sound hole 13 facing the sound outlet 214. The sound wave generated by the diaphragm 221 is transmitted to outside through the sound outlet 214 and the second sound hole 13. In this embodiment, a plurality of the second sound holes is arranged in an array.

Please refer to FIG. 4, the diaphragm 221 is fixed to the front cover 212 and covers the sound outlet 214. The sound outlet 214 is configured to face the diaphragm 221 along a vibration direction of the diaphragm 221.

The speaker module 2 provided in the present embodiment has shorter sound propagation path and lower attenuation during the sound propagation.

Embodiment 2

Figure 5:
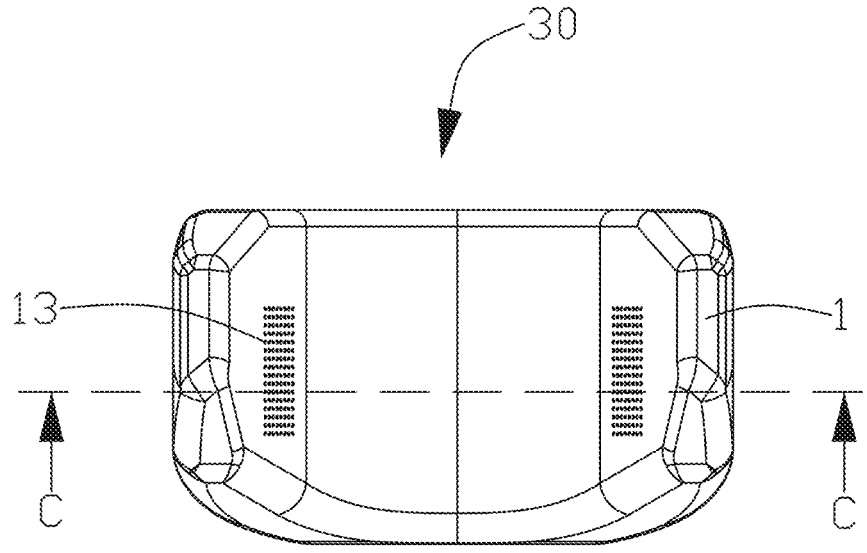
FIG. 5 is a front view of a vehicle headrest in accordance with a second exemplary embodiment of the present disclosure.
Figure 6:
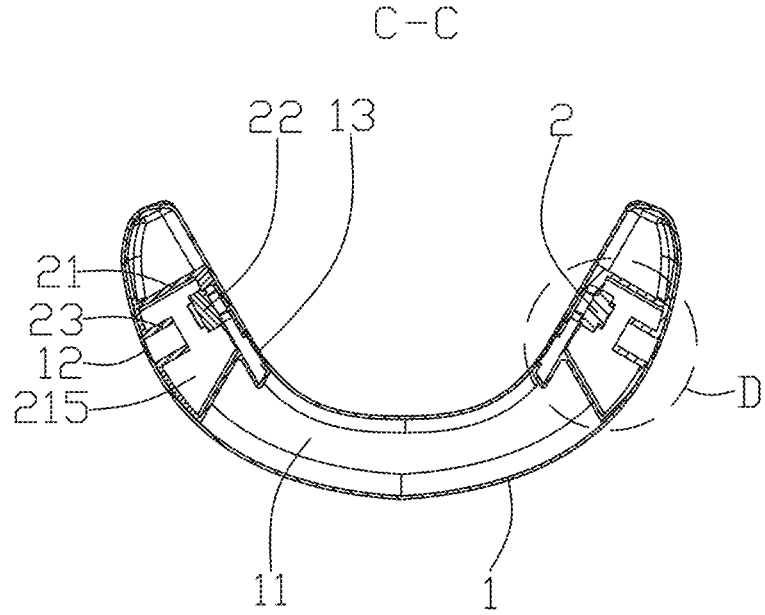
FIG. 6 is a cross-sectional view of the vehicle headrest taken along C-C line in FIG. 5.

As shown in FIGS. 5-7, the vehicle headrest 30 in the present embodiment is a frontage sound emitting structure. The difference between this embodiment and the embodiment 1 is that the diaphragm 221 is fixed to the side wall 211. A front sound chamber 217 communicated with the sound outlet 214 is enclosed by the diaphragm 221, the side wall 211 and the front cover 212. The sound outlet 214 is malposed with the diaphragm 221 along a vibration direction of the diaphragm 221.

In the present embodiment, the second sound hole 13 is closer to user's ear, thus increasing the dependency between the vehicle headrest 30 and user's ear and improving the acoustic privacy of the vehicle headrest 30.

Embodiment 3

The vehicle headrest 30 in the present embodiment is a side sound emitting structure.

Please refer to FIGS. 8-11, the main body further includes a second sound hole penetrating thereon. The housing 21 extends out of the receiving chamber 11 through the second sound hole. The sound outlet 214 is located outside the receiving chamber 11. Furthermore, the housing 21 includes a front cover 212, a back cover 213 opposite to the front cover 212, and a side wall 211 connected the front cover 212 with the back cover 213. The front cover 212 and part of the side wall 211 extend out of the receiving chamber 11 through the second sound hole. The sound outlet 214 is provided on the side wall 211. The sound outlet 214 extends along a direction different from a vibration direction of the diaphragm 221.

Figure 11:
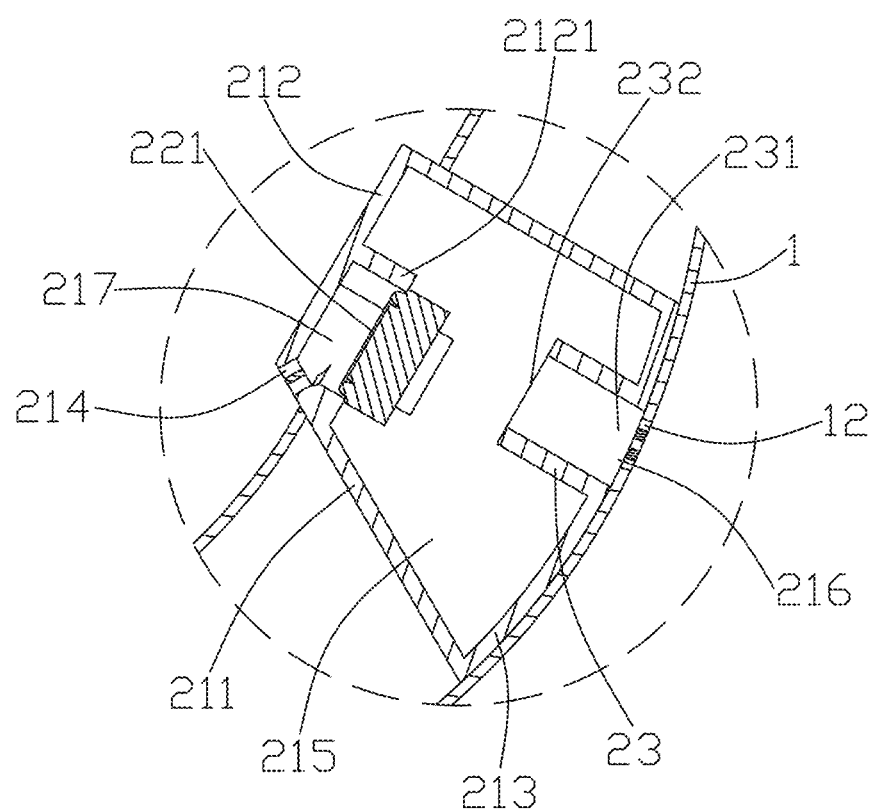
FIG. 11 is an enlarged view of Part F in FIG. 10.

As shown in FIG. 11, the front cover 212 includes a protrusion 2121 located on a side towards the back cover 213. The diaphragm 221 is mounted on the protrusion 2121 and the side wall 211. A front sound chamber 217 communicated with the sound outlet 214 is enclosed by the diaphragm 221, the side wall 211 and the protrusion 2121.

In the present embodiment, the sound outlet 213 is closer to user's ear, thus increasing the dependency between the vehicle headrest 30 and user's ear and improving the acoustic privacy of the vehicle headrest 30.

In other embodiment, it should be noted that the diaphragm 221 can be fixed to the side wall 211 and covers the sound outlet 214 provided on the side wall 211, thus enabling the sound wave generated by the diaphragm 221 to be transmitted to outside through the sound outlet 21.

Figure 12:
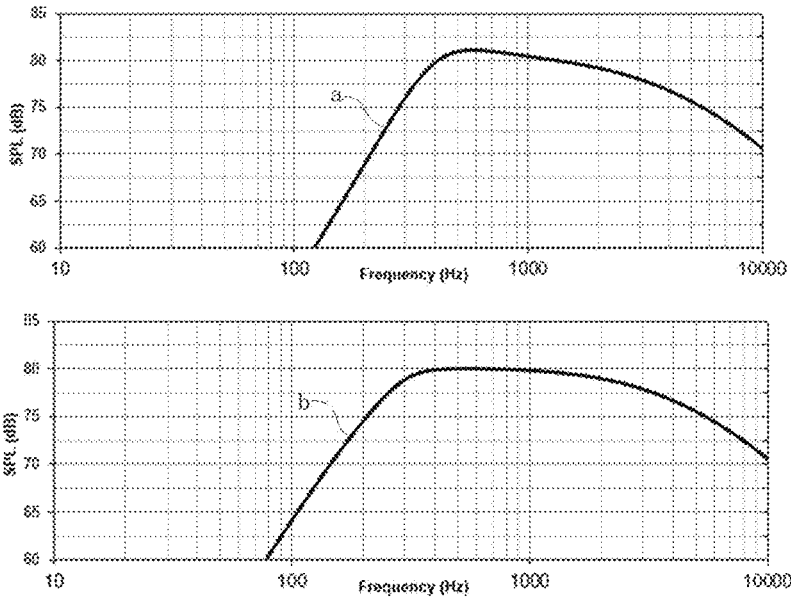
FIG. 12 is a schematic diagram of the acoustic performance comparison between a speaker module having an acoustic inverting tube and a speaker module without an acoustic inverting tube.

Please refer to FIG. 12, curve a is the frequency response curve of a speaker module without an acoustic inverting tube 23 in its coupling back cavity 215 under an input voltage of 1V. Curve b is the frequency response curve of a speaker module having an acoustic inverting tube 23 in its coupling back cavity 215 under an input voltage of 1V. It is clearly shown that the speaker module 2 having an acoustic inverting tube 23 in its coupling back cavity 215 has better low frequency performance.

Figure 13:
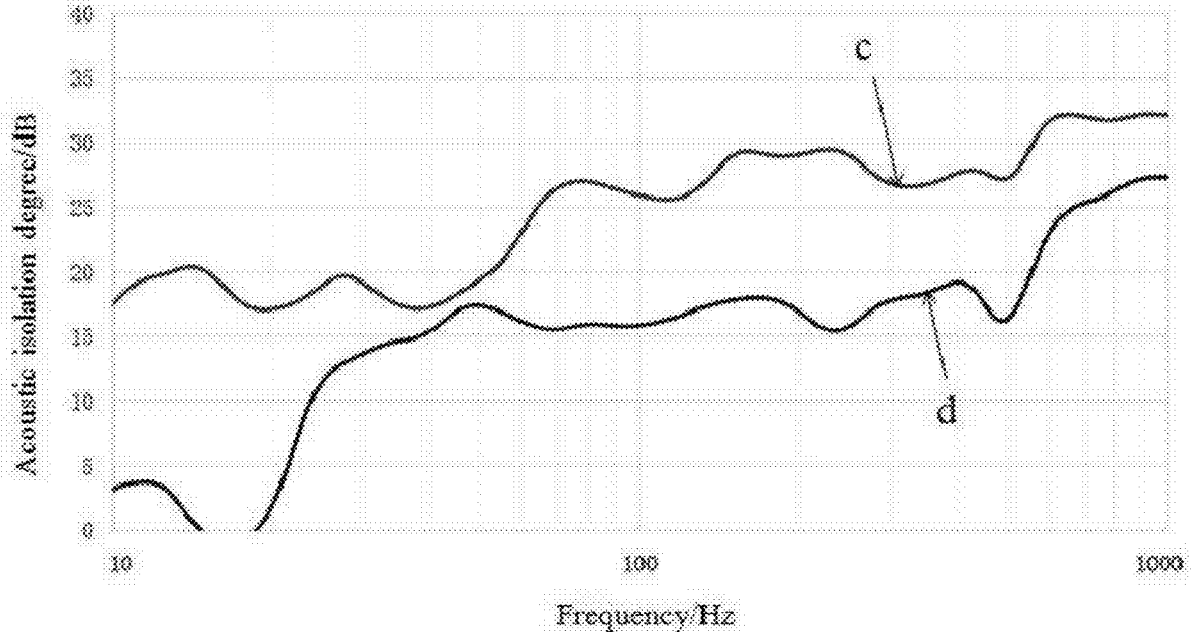
FIG. 13 is a schematic diagram of the acoustic isolation degree comparison between a vehicle headrest having a speaker module and a vehicle headrest without a speaker module.
Figure 14:
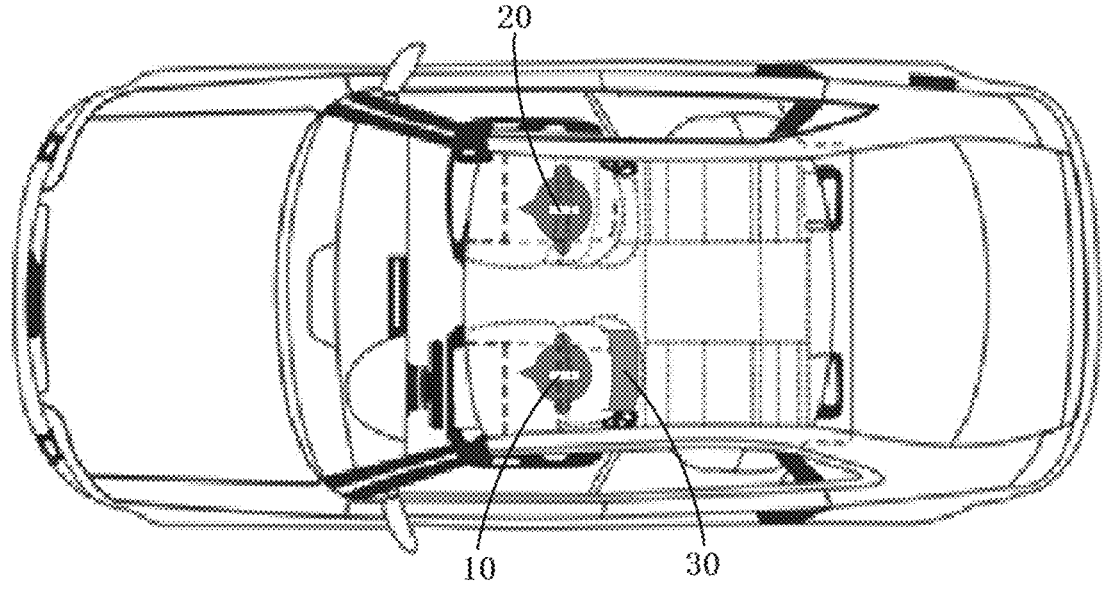
FIG. 14 is an isometric view of a vehicle equipped with a first sound device, a second sound device, and the vehicle headrest disclosed in the present disclosure.

Please refer to FIGS. 13-14, a first sound device 10 and a second sound device 20 is equipped in a vehicle. Specifically, the vehicle headrest 30 is mounted on driver's seat. The first sound device 10 is mounted on driver's seat and the second sound device 20 is mounted on co-driver's seat. Curve c is the acoustic isolation degree of a vehicle headrest having a speaker module. Curve d is the acoustic isolation degree of a vehicle headrest without a speaker module. It should be noted that the acoustic isolation degree represents a difference between the frequency response of the first sound device 10 and the second sound device 20. It is clearly shown that vehicle headrest 30 having the speaker module 2 has higher acoustic isolation degree.

In one embodiment, sound wave emitted from the back sound hole 216 has a first sound phase, sound wave emitted from the sound outlet 214 has a second sound phase, a difference between the first sound phase and the second sound phase is in a range of $2\pi/3$-$4\pi/3$, such as $2\pi/3$, $5\pi/6$,$\pi$, $7\pi/6$, $4\pi/3$, thus resulting in acoustic cancellation between the back sound hole 216 due to the sound phase difference and the sound outlet 214 and then reducing the sound leakage of the speaker unit 22 and further improving the acoustic privacy of the vehicle headrest 30.

Specifically, the sound wave emitted from the back sound hole 216 and the sound wave emitted from the sound outlet 214 satisfy the following formula:

$$U_1(r_1 + j\omega M_1) + (U_1 - U_s)\left(r_b + \frac{1}{j\omega C_b}\right) = 0$$

6

U1 represents a volume velocity of the back sound hole 216 when emitting the sound wave; Us represents a volume velocity of the sound outlet 214 when emitting the sound wave; r1 represents an acoustic resistance of the acoustic inverting tube 23; $M_1$ represents an acoustic mass of the acoustic inverting tube 23; $r_b$ represents an acoustic resistance of the coupling back cavity 215; $C_b$ represents an acoustic capacity of the coupling back cavity 215; ω represents an angular frequency of the sound wave; j is an imaginary unit.

By transforming the above formula, the following formula can be obtained:

$$\frac{U_s}{U_1} \approx \left(1 - \frac{\omega^2}{\omega_c^2}\right) + j\omega C_b r_1$$

$w_c$ represents an angular frequency of the coupling back cavity 215 and the acoustic inverting tube 23.

It can be seen that Us/$U_1$ is a complex number having a phase difference φ that can be adjusted by optimizing the coupling back cavity 216 and the acoustic inverting tube 23. Therefore, the sound wave emitted front he back sound hole 216 has lower sound amplitude that the sound wave emitted from the sound outlet 214, thus achieving acoustic cancellation and improving the acoustic privacy of the vehicle headrest 30.

Specifically, the acoustic inverting tube 23 can be optimized by adjusting its length, the opening size and the opening shape. The coupling back cavity 215 can be optimized by adjusting its shape, size, and inner filling.

In one embodiment, the size of the speaker unit 22 is 30 mm×60 mm×18 mm. The volume of its coupling back cavity 215 is 15 cc. As shown in FIGS. 3-4, one end of the acoustic inverting tube 23 is fixed to the back cover 213, the other end of the acoustic inverting tube 23 extends towards the speaker unit 22. The length of the acoustic inverting tube 23 is 3 cm. A diameter of the end of the acoustic inverting tube 23 connected to the housing 21 is 2 cm.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vehicle headrest comprising:
a main body having a receiving chamber, and including a first sound hole penetrating thereon; and
a speaker module at least partially received in the receiving chamber, including:
  a housing fixed to the main body, including a sound outlet penetrating thereon;
  a speaker unit received in the housing, including a diaphragm configured to vibrate to generate sound wave transmitted to outside through the sound outlet;
  an acoustic inverting tube having a first opening and a second opening located on both ends; wherein
a coupling back cavity isolated from the sound outlet is enclosed by the diaphragm and the housing; the housing further comprises a back sound hole communicated with the coupling back cavity; the acoustic inverting tube is received in the coupling back cavity; the first opening is communicated with the back sound hole; the second opening is communicated with the coupling back cavity; the first sound hole is communicated with the back sound hole; sound wave emitted from the back sound hole has a first sound phase, sound wave emitted from the sound outlet has a second sound phase, a difference between the first sound phase and the second sound phase is in a range of $2\pi/3$-$4\pi/3$.

2. The vehicle headrest as described in claim 1, wherein the housing is wholly received in the receiving chamber; the housing comprises a front cover, a back cover opposite to the front cover, and a side wall connected the front cover with the back cover; the sound outlet is provided on the front cover; the back sound hole is provided on the back cover; the main body further comprises a second sound hole facing the sound outlet; sound wave generated by the diaphragm is transmitted to outside through the sound outlet and the second sound hole.

3. The vehicle headrest as described in claim 2, wherein the diaphragm is fixed to the front cover and covers the sound outlet; the sound outlet is configured to face the diaphragm along a vibration direction of the diaphragm.

4. The vehicle headrest as described in claim 2, wherein the diaphragm is fixed to the side wall; a front sound chamber communicated with the sound outlet is enclosed by the diaphragm, the side wall and the front cover; the sound outlet is malposed with the diaphragm along a vibration direction of the diaphragm.

5. The vehicle headrest as described in claim 1, wherein the main body further comprises a second sound hole penetrating thereon; the housing extends out of the receiving chamber through the second sound hole; the sound outlet is located outside the receiving chamber.

6. The vehicle headrest as described in claim 5, wherein the housing comprises a front cover, a back cover opposite to the front cover, and a side wall connected the front cover with the back cover; the front cover and part of the side wall extend out of the receiving chamber through the second sound hole; the sound outlet is provided on the side wall.

7. The vehicle headrest as described in claim 6, wherein the front cover comprises a protrusion located on a side towards the back cover; the diaphragm is mounted on the protrusion and the side wall; a front sound chamber communicated with the sound outlet is enclosed by the diaphragm, the side wall and the protrusion.

8. The vehicle headrest as described in claim 1, wherein sound wave emitted from the back sound hole and sound wave emitted from the sound outlet satisfy the following formula:

$$U_1(r_1 + j\omega M_1) + (U_1 - U_s)\left(r_b + \frac{1}{j\omega C_b}\right) = 0$$

U1 represents a volume velocity of the back sound hole when emitting the sound wave;

Us represents a volume velocity of the sound outlet when emitting the sound wave;

r1 represents an acoustic resistance of the acoustic inverting tube;

M1 represents an acoustic mass of the acoustic inverting tube;

rb represents an acoustic resistance of the coupling back cavity;

Cb represents an acoustic capacity of the coupling back cavity;

ω represents an angular frequency of the sound wave;

j is an imaginary unit.

* * * * *